United States Patent [19]

Tilles et al.

[11] Patent Number: 4,651,867

[45] Date of Patent: Mar. 24, 1987

[54] APPARATUS FOR DISCHARGING FREE-FLOWING AND VISCOUS MATERIALS FROM A BELT CONVEYOR

[76] Inventors: Robert S. Tilles, B. Rzhevsky pereulok,2,kv.9.; Sergei S. Nenakhov, ulitsa Shipilovskaya,9,korpus 2,kv.I30., both of Moscow; Vitaly V. Savinykh, ulitsa Lenina,I,kv.I39., Istra, Moskovskoi oblasti, all of U.S.S.R.

[21] Appl. No.: 821,415

[22] Filed: Jan. 22, 1986

[30] Foreign Application Priority Data

Mar. 26, 1985 [SU]  U.S.S.R. .................................. 3874940

[51] Int. Cl.⁴ ............................................... B65G 37/00
[52] U.S. Cl. ......................................... 198/524; 193/29
[58] Field of Search ...................... 198/524; 193/14, 29

[56] References Cited

U.S. PATENT DOCUMENTS 3,598,224  8/1971  Oury .
4,306,895  12/1981  Thompson et al. ............... 193/29 X

FOREIGN PATENT DOCUMENTS 1433718  4/1976  United Kingdom .................. 193/29

Primary Examiner—Jeffrey V. Nase
Attorney, Agent, or Firm—Burgess, Ryan & Wayne

[57] ABSTRACT

An apparatus for discharging free-flowing and viscous materials from a belt conveyor comprises a discharge end of a conveyor having a discharge roll. a frame means is provided at the discharge end of the conveyor and supports a guide means provided downstream the discharge roll. A feed funnel-like means is provided on the frame means under the guide means. A tubular guide member made of a flexible material in the form of a hollow cylinder has one end thereof secured to the funnel-like means and is made with a longitudinal cut extending along the whole length thereof. The tubular guide member has means for interconnecting the extremities of the cut extending along the whole length thereof on either side of the cut, said means being disengageable when the load thereon becomes greater than a predetermined value.

6 Claims, 8 Drawing Figures

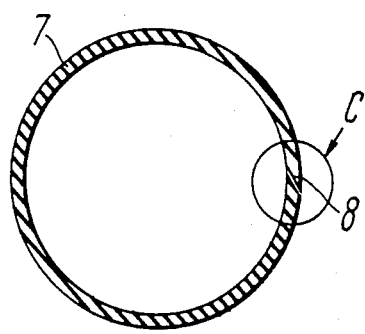 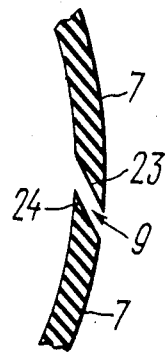
FIG.6  FIG.7
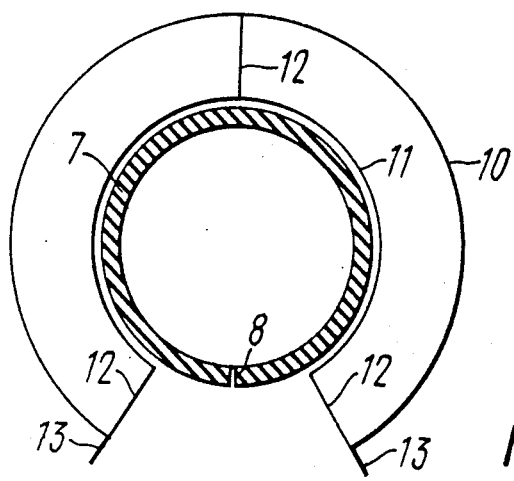
FIG.8

APPARATUS FOR DISCHARGING FREE-FLOWING AND VISCOUS MATERIALS FROM A BELT CONVEYOR

FIELD OF THE ART

The invention relates to the conveyor handling of materials, and in particular, it deals with apparatuses for discharging free-flowing and viscous materials from a belt conveyor.

The apparatus may be used for discharging and transferring free-flowing and viscous materials from belt conveyors at points where there is a substantial difference of altitude between the discharge end of a feed conveyor and a take-up platform or take-up end of another conveyor. Such conditions most frequently obtain in handling materials by means of belt conveyors in the mining and construction industries, e.g. in open-pit mines for mining minerals, in the construction of large-size concrete or earth-filled installations.

BACKGROUND OF THE INVENTION

Known in the art is an apparatus for discharging materials from a conveyor, comprising a vertically extending discharge chute (spout) in the form of a truncated cone (cf. A. K. Tretyakov. Concrete Operations. Moscow, Vysshaya Shkola, 1979, p. 66).

The apparatus is deficient in that a material, especially concrete, may bridge over therein in the narrowest portion of the duct which may cause clogging and stoppage of the conveyor.

In case of clogging, with the discharge chute of such type being cantilevered to a discharge conveyor, the load upon the conveyor frame considerably increases which may cause damage to the conveyor.

In addition, in case of clogging the discharge chute is overfilled with the material being handled and the material engages the conveyor belt. The belt may be worn or broken.

Known in the art is another apparatus for discharging free-flowing and viscous materials from a belt conveyor which is designed to protect the frame of a cantilevered conveyor against overload in case of overfilling of a spout, comprising a deflector, a discharge hopper and a flexible tubular guide member (spout) disposed under the hopper and having a means for disconnecting the spout from the discharge hopper in case of clogging of the flow of material therein when the weight of the material accumulated in the spout reaches a predetermined critical value (cf. U.S. Pat. No. 3598224, Int. Cl. B 65 G 15/26, Nov. 22, 1968-prior art).

Such apparatuses are deficient in that actuation of the means protecting the conveyor frame against overload causes spillage of the material being handled over the spout edges, the material falling into the zone in which operating personnel is circulating. It should be noted that it is not possible to predict the time of actuation of the protective means, nor can one expect in which direction the material will fall down. It should also be noted that, in spite of the provision of protective devices for switching off the conveyor at the moment of actuation of the means for protecting the conveyor frame against overload, the material would spill over the spout edge just the same because of the coasting of the conveyor belt. In addition, in case of clogging of the spout and an increase in the mass of the material accumulating in the spout the frame of the cantilevered conveyor would sag down. When the load becomes critical, the spout is disconnected with a jerk so that the frame will move up suddenly upon disconnection which may cause various damages to the conveyor and negatively affect its reliability. In addition, it is difficult to eliminate clogging since the spout is in the form of an elongated flexible tubular member without slots in the side walls. Consequently, the operating personnel should handle the jammed lumps laterally through the spout walls or from bottom, and this may lead to damages to the spout or injuries to the operating personnel.

It is an object of the invention to improve safety in operation of an apparatus for discharging free-flowing and viscous materials from a belt conveyor.

Another object of the invention is to reduce dynamic loads on the frame of a cantilevered conveyor upon actuation of a means for preventing clogging. Still another object of the invention is to facilitate maintenance of the spout in remedying clogging.

SUMMARY OF THE INVENTION

An apparatus for discharging free-flowing and viscous materials from a belt conveyor according to the invention comprises a discharge end of a conveyor having a discharge roll; a frame means mounted on said discharge end of the conveyor; a guide means secured to said frame means downstream said discharge roll; a feed funnel-like means mounted on said frame means under said guide means; a tubular guide member made in the form of a hollow cylinder of a flexible material having one end secured to said feed funnel-like means; said tubular guide member having a longitudinally extending cut along the whole length thereof; means for interconnecting the extremities of the cut of said tubular guide member, said means extending along the whole length of the cut on either side thereof and being capable of disconnecting the extremities of the cut from each other when the load on said means becomes greater than a predetermined value.

This construction makes it possible to improve safety of the discharge apparatus in operation since in case of clogging and actuation of the means for protecting the conveyor frame against overload the material accumulated in the flexible tubular member would only fall on the side where there is the longitudinally extending cut.

In addition, the extremities of the cut of the tubular member are not disconnected from each other in a jerky manner, but rather gradually. Apart from that, the tubular member itself remains connected to the conveyor frame so that the load on the conveyor frame is not reduced sudddenly as in the prior art, but gradually thus preventing the frame from being damaged.

In addition, in case of clogging of the material being handled in the tubular member remedying of the clogging in the spout is facilitated. For remedying the clogging, the operating personnel are to disconnect the extremities of the cut from each other and clean the inner surface of the tubular member with scrapers or wash it if necessary, whereafter the extremities of the cut can be interconnected again.

The means for interconnecting the extremities of the cut may take different forms.

Thus said means for interconnecting the extremities of the cut of said tubular member may comprise toothed members; said toothed members on the one side of the cut being engageable with said toothed members on the other side of the cut.

This construction makes it possible to enable disconnection of toothed members from each other by making the toothed members of materials having different elastic properties, and with different geometry and shape to fit different pre-set loads.

Said toothed members disposed on the one side of the cut may be provided with attachable elastic members disposed on the outer and inner sides of the tubular member.

This construction prevents the toothed members from disengaging from each other during dynamic interaction of the walls of the tubular member with the material discharged from the conveyor and, at the same time, the toothed members would not hamper the disconnection upon clogging of the spout and an increase in the radial load on the walls of the tubular member.

In an another embodiment the means for interconnecting the extremities of the cut comprise a U-shaped groove extending along the one side of the cut and capable of receiving the other extremity of the cut.

This construction simplifies the means for interconnecting the extremities of the cut.

In this case the tubular member should be provided with elastic rings spaced along the whole length thereof externally of the tubular member.

The provision of the tubular member with the elastic rings with the U-shaped groove in the cut is aimed at ensuring the closure of the tubular member in the working position and disconnection of the extremities of the cut from each other in case of clogging.

A third embodiment of the means for interconnecting the extremities of the cut involves the provision of magnetic means extending along the whole length on the one side of the cut and ferromagnetic members extending along the whole length on the other side of the cut for cooperation with said magnetic members.

This embodiment simplifies the construction of the means for interconnecting the extremities of the cut and reduces labour effort in operation

BRIEF DESCRIPTION OF THE DRAWINGS

The invention will now be described with reference to specific embodiments illustrated in the accompanying drawings, in which:

FIG. 6 is a view showing an embodiment of a tubular guide member similar to that shown in FIG. 4;

FIG. 7 is a detail C in FIG. 6;

FIG. 8 is a sectional view taken along line VIII—VIII in FIG. 1.

DETAILED DESCRIPTION OF THE INVENTION

Figure 1:
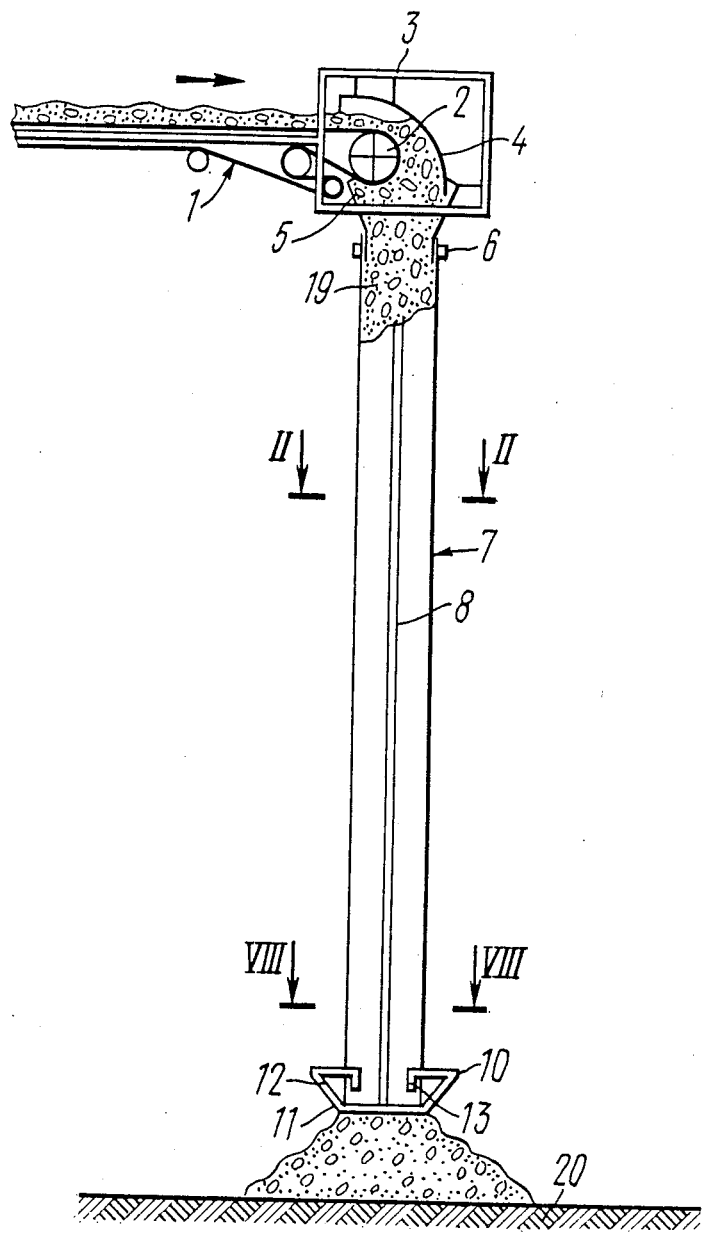
FIG. 1 is a schematic view of an apparatus according to the invention, a side elevation.
Figure 3:
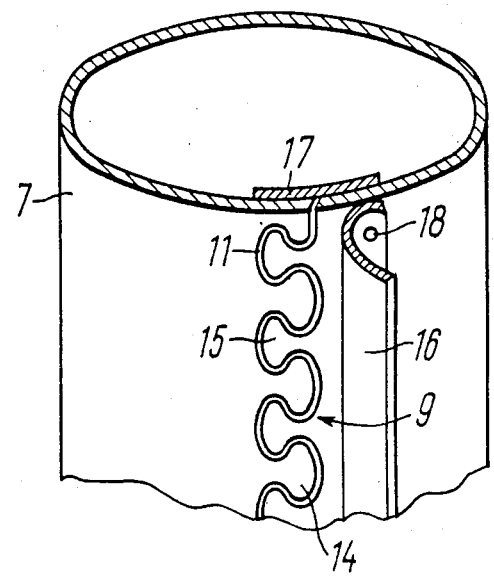
FIG. 3 is a view along arrow A in FIG. 2, with a bent-away strap.
Figure 5:
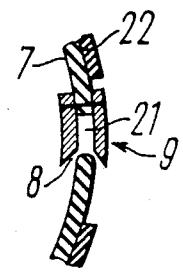
FIG. 5 is a detail B in FIG. 4.

An apparatus for discharging free-flowing and viscous materials from a conveyor comprises a discharge end of a conveyor 1 having a discharge roll 2. Mounted on the discharge end of the conveyor 1 is a frame means (frame) 3 to which are secured: a guide means (guide baffle) 4 and a feed funnel-like means (feed funnel) 5 (FIG. 1). At the lower end of the feed funnel 5 there is a tubular guide member (spout) 7 secured by means of a clamping collar 6 and made of a flexible material. The spout 7 has a longitudinally extending cut 8 along the whole length thereof, means 9 being provided on the extremities of the cut for interconnecting the extremities of the cut (FIGS. 3, 5, 7).

A handrail 10 may be provided in the bottom part of the spout 7 and secured to the walls of the spout 7 by means of a ring 11 and straps 12 (FIGS. 1 and 8).

The handrail 10 has guard shields 13 in the zone of the cut 8 to give warning to the operating personnel that they are in the zone of eventual fall of the material.

The means 9 for interconnecting the extremities of the cut extend along the whole length thereof and are disengageable in case the load thereon increases.

Figure 2:
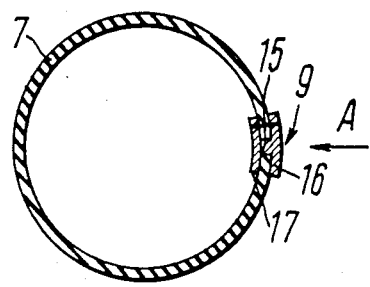
FIG. 2 is a sectional view taken along line II—II in FIG. 1.

The means 9 for interconnecting the extremities of the cut may comprise toothed members 14 disposed on the one side of the cut and toothed members 15 disposed on the other side of the cut (FIGS. 2, 3). The toothed members 14 and 15 are engageable with one another so as to form the closed spout 7.

The toothed members (e.g. the toothed members 15) may have, externally and internally of the spout 7, attachable elastic members (straps) 16 and 17 secured to the spout 7, e.g. by means of fasteners 18 (FIG. 3).

The apparatus for discharging free-flowing and viscous materials from a conveyor functions in the following manner.

During operation of the conveyor 1 a material 19 being discharged moves in the direction shown by arrow in FIG. 1 and is directed by the baffle 4 into the funnel 5 under which there is provided the spout 7 rigidly secured to the funnel 5 by means of the clamping collar 6. In case of an emergency situation, when the material being conveyed is jammed in the spout 7, e.g. because of the presence of oversized lumps or objects, or owing to gradual sticking and hardening of a viscous material on the inner surface of the spout 7, or by virtue of other factors, the mass of the spout 7 starts increasing, and lateral pressure upon the inner walls of the spout exerted by the material 19 also increases. As the spout 7 is filled with the material being conveyed, lateral pressure exerted by the material to the walls of the spout 7 increases. It should be noted that maximum lateral pressure is built-up in the bottom part of the spout 7 under the action the material 19 being discharged which accumulates there. As a result, the means 9 for interconnecting the extremities of the longitudinal cut 8 of the spout 7 are actuated and the periphery of the spout 7 opens spontaneously at the points of clogging so as to clean the spout from the material 19 accumulated therein through the aperture thus formed. The conveyor 1 is stopped simultaneously with the opening of the periphery of the spout 7. The means 9 for interconnecting the extremities of the cut 8 made in the form of the toothed members 14 and 15 are disconnected from one another because an increase in the load acting upon the walls of the spout 7 results in an increase in the force tensioning the spout in the radial direction, the toothed members 14 and 15 being elastically deformed and disengaging from one another. The longitudinal elastic straps 16 and 17 disposed above the toothed members 14, 15, on one of the extremities of the cut do not allow them to move relative to one another and to disengage from one another before they are deformed. Therefore, a substantial force is required for the extremities of the cut to be disconnected from each other, and the cut would not open during the interaction of the walls of the spout 7 with the material 19 being conveyed if there is no clogging in the spout. Provision of the straps 16 and 17 made of an elastic material is necessary to prevent the extremities of the cut from being disconnected from each other under dynamic action of the material 19 being conveyed upon the means 9 for interconnecting the extremities of the cut.

In case a "plug" of the material 19 being transported is formed in the spout 7 the material exerts a lateral pressure to the walls of the spout 7 so that the toothed members 14 and 15 made of an elastic material are deformed to disengage from one another, the cut 8 opens, and the self-cleaning of the spout 7 from the material clogging it occurs. The spout 7 is returned to the working position in the following manner. The outer elastic strap 16 is bent away, and the toothed members 14 of one extremity of the spout 7 are brought in engagement with the toothed members 15 of the other extremity of the spout 7. Then the strap 16 is released to close the joint of the spout cut together with the strap 17.

It should be noted that conveyor systems with concrete placing conveyors built-around swinging telescopic or extensible cantilevered conveyors covering a large discharge area are widely used nowadays in the construction of power production plants having concrete installations. The material is generally discharged through the discharge roll 2 of the conveyor 1 using the discharge spout 7 since the discharge height is 20 m and even more. Therefore, one of the main factors determining the efficient operation of the conveyor systems is the reliable and safe operation of apparatuses for discharging free-flowing and viscous materials. In addition, the design of the spout should prevent the spout from being overfilled with the material being conveyed in case of emergency clogging of the spout since otherwise the conveyor should have a frame designed with a large safety margin. Such conveyor frame would be rather heavy which is undesirable under the above-mentioned operation conditions. In addition, means for protecting the spout against overfilling should be so constructed that no substantial dynamic loads may be applied to the frame of the catnilevered conveyor upon their actuation.

The provision of the spout 7 having the longitudinal cut 8 and the means 9 for interconnecting the extremities of the cut 8 which are disengageable upon an increase in the load thereon makes it possible to lower dynamic loads on the frame of the cantilevered conveyor 1 upon disengagement of the means 9 from one another. This is due to the fact that disengagement of the toothed members 14 and 15 upon clogging of the spout begins in the zone of the strongest lateral pressure of the material exerted upon the walls of the spout 7, i.e. in the lower part of the "plug". The spout 7 is thus freed from the material clogging it gradually rather than suddenly. Therefore, the conveyor frame may be made with a lower safety margin, hence it can be lighter in weight, and the entire conveyor system becomes more effective in operation.

This apparatus is operated in the following manner.

The operating personnel place the material 19 being discharged on a platform 20 using the handrail 10 secured to the spout 7 by means of an open ring 11 and straps 12. The handrail 10 divides the working zone into a normal working zone in which a man can be safe and a risk zone within a limited space in the area of the longitudinal cut 8 of the spout 7 where the presence of a man is ruled out because the material may fall through an aperture of the cut. For that purpose, the guard shields 13 are secured to the ends of the handrail 10, and they can carry plates bearing the warning that here the dangerous zone begins (FIG. 8).

After the conveyor 1 has been stopped and the spout 7 cleaned from the clogging material, the open zone of the periphery of the spout 7 is again closed, and the conveyor 1 is again started.

Figure 4:
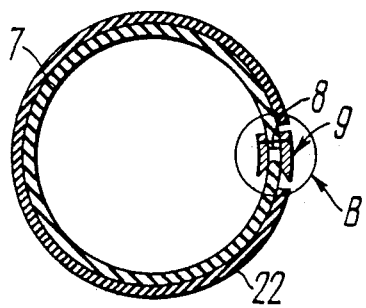
FIG. 4 is a transverse sectional view of an embodiment of a tubular guide member similar to that shown in FIG. 2.

The means 9 for interconnecting the extremities of the longitudinal cut 8 of the spout 7 disengageable upon an increase in the load thereon may be made in various forms. In addition to the design of such means in the form of the toothed members 14 and 15 and elastic straps 16 and 17, the means for interconnecting the extremities of the cut may also comprise a U-shaped groove 21 disposed on the one side of the cut 8 and capable of receiving the other extremity of the cut (FIGS. 4 and 5). In this case the spout 7 is provided with elastic rings 22 in the form of split rings installed outside the spout 7 and spaced apart from one another.

In another embodiment of the means 9 for interconnecting the extremities of the cut 8 magnetic members 23 and ferromagnetic members 24 (FIG. 7) may be provided on these extremities, respectively, which are spaced along the whole length of the cut 8 and cooperate with one another.

Operation of the apparatus with these embodiments of the means 9 for interconnecting the extremities of the cut 8 is similar to operation of the above described spout 7 having the toothed members 14 and 15.

When a predetermined lateral pressure exerted by the material 19 to the spout walls is achieved, the extremities of the cut 8 are disconnected from each other, the elastic rings 22 (FIG. 5) are forced to move apart, and one extremity of the spout 7 moves out of the U-shaped groove 21 along the cut or, in case of the magnetic members, the magnetic members 23 (FIG. 7) secured along one extremity of the cut of the spout 7 disengage from the other extremity of the longitudinal cut of the spout to which the ferromagnetic members 24 are secured. Clogging of the material in the spout 7 is thus eliminated, and the spout is cleaned from the sticking material and returned to the working position.

We claim:

1. An apparatus for discharging free-flowing and viscous materials from a belt conveyor, comprising a discharge end of the conveyor having a discharge roll; a frame means mounted on said discharge end of the conveyor;
   a guide means secured to said frame means downstream said discharge roll;
   a feed funnel-like means mounted on said frame means under said guide means;
   a tubular guide member made of an flexible material in the form of a hollow cylinder, said guide member having one end thereof secured to said feed funnel-like means;
   said tubular guide member having a longitudinally extending cut along the whole length thereof;
   means for interconnecting the extremities of the cut of said tubular guide member disposed along the whole length of the cut on either side thereof, said means being capable of disconnecting the extremities of the cut from each other when the load thereon becomes greater than a predetermined value.

2. An apparatus for discharging free-flowing and viscous materials from a belt conveyor according to claim 1, wherein said means for interconnecting the extremities of the cut of said tubular guide member are in the form of toothed members;

said toothed members disposed on the one side of the cut being engageable with said toothed members disposed on the other side of the cut.

3. An apparatus for discharging free-flowing and viscous materials from a belt conveyor according to claim 2, wherein said toothed members on the one side of the cut are provided with attachable elastic members.

4. An apparatus according to claim 1, wherein a means for interconnecting the extremities of the cut comprises a U-shaped groove disposed on the one side of said cut and capable of receiving the other extremity of the cut.

5. An apparatus according to claim 4, wherein said tubular guide member is provided with elastic rings mounted externally of said guide member along the whole length thereof and spaced apart from one another.

6. An apparatus for discharging free-flowing and viscous materials from a belt conveyor according to claim 1, wherein the extremities of the longitudinal cut of said tubular guide member are provided on the one side with magnetic members extending along the whole length of the cut and on the other side with ferromagnetic members also extending along the whole length of the cut opposite to respective magnetic members.

* * * * *